United States Patent [19]

Giubileo

[11] Patent Number: 4,571,452
[45] Date of Patent: Feb. 18, 1986

[54] ELECTRIC CABLE SEALING END
[75] Inventor: Giancarlo Giubileo, Nerviano, Italy
[73] Assignee: Societa' Cavi Pirelli S.p.A., Milan, Italy
[21] Appl. No.: 630,652
[22] Filed: Jul. 13, 1984
[30] Foreign Application Priority Data Jul. 22, 1983 [IT] Italy .............................. 22189 A/83

[51] Int. Cl.[4] .......................................... H02G 15/04
[52] U.S. Cl. .................... 174/77 R; 411/146; 411/228
[58] Field of Search ............. 174/19, 20, 74 R, 75 R, 174/75 D, 77 R, 79, 80; 411/145, 146, 227, 228, 542, 544, 545, 7

[56] References Cited

U.S. PATENT DOCUMENTS

| | | | |
|---|---|---|---|
| 955,054 | 4/1910 | Darby | 411/228 X |
| 1,377,397 | 5/1921 | Chance | 411/146 X |
| 2,355,166 | 8/1944 | Johanson | 174/77 R |
| 2,454,838 | 11/1948 | Richardson et al. | 174/77 R |
| 2,924,467 | 2/1960 | Burch | 174/77 R |
| 3,055,972 | 9/1962 | Peterson | 174/77 R |
| 3,273,443 | 9/1966 | Rubin | 411/7 |
| 3,493,670 | 2/1970 | Broadbelt et al. | 174/77 R |
| 4,055,208 | 10/1977 | Blaul | 411/145 X |

FOREIGN PATENT DOCUMENTS

| | | | |
|---|---|---|---|
| 56489 | 7/1939 | Denmark | 174/74 |
| 729789 | 12/1966 | Italy | 174/19 |
| 688044 | 2/1953 | United Kingdom . | |
| 748150 | 4/1956 | United Kingdom . | |

Primary Examiner—A. T. Grimley
Assistant Examiner—Morris H. Nimmo
Attorney, Agent, or Firm—Brooks Haidt Haffner & Delahunty

[57] ABSTRACT

An electric cable sealing end in which the insulator which screws into a sealing box part and the box part distal end have rings therebetween with facing, complementary, engageable saw teeth. One ring is rotatable by the insulator and the other ring is held stationary by the box part. When the insulator is tightened, the saw teeth permit rotation thereof but after tightening, the saw teeth prevent rotation of the insulator in the loosening direction unless one of the rings is intentionally broken and removed.

8 Claims, 4 Drawing Figures

ELECTRIC CABLE SEALING END

The present invention relates to a cable sealing end, in particular to a sealing end for cables having an extruded or impregnated paper insulation, and more particularly, the present invention relates to the means for tightly connecting the sealing end box to the insulators.

The known cable sealing ends are provided with a box and at least an insulator connected, in a fluid-tight manner, to the box itself. The problem which is faced in these sealing ends is that of assuring a perfect tightness at the connection between the box and the insulators in order to avoid the escape of impregnants present in the sealing end itself.

In the known sealing ends for cables and, in particular, for cables having an extruded or impregnated paper insulation, the connection between the box and the insulator is effected through a screw coupling operation between one end of the insulator and a through opening provided in the box into which one end of the insulator is inserted.

In the known sealing ends, the fluid-tightness in the connection between the box and the insulator is realized by means of a sealing strip interposed between one flange, present in cantilever fashion within the through cavity of the box, and the end of the insulator inserted in the through cavity itself. In fact, during the insertion of the insulator end into the through cavity of the box and the mutual connection between these elements effected through the screw coupling operation, the sealing strip gets deformed, being compressed and elastically deformed against the supporting flange for the sealing strip by the insulator end.

In the known sealing ends, after having mechanically connected, in a tight manner, the box and the insulator as described above, a hardening mastic, for instance, the mastic sold under the trademark Araldite, is poured in the zone of connection between the box and the insulator so as to provide a blocking of the screw type mechanical connection between the elements in question.

In spite of the most careful efforts in effecting the connection between the box and the insulator, losses of tightness occur in the known sealing end, especially after the cable has been operating for a time. Said losses require difficult procedures to restore the tightness of the connection.

In fact, in order to restore the tightness in the connection, it is necessary to increase the deformation of the elastically deformable sealing strip, but to carry this out, it is necessary to first remove the hardening mastic interposed between insulator and box. After having increased the pressure forcing these two elements to each other, it is necessary to apply some new hardening mastic.

Further, it is necessary to keep periodically under supervision the known sealing ends to assure the existence of the tightness in the connection described above.

One object of the present invention is that of eliminating the above described drawbacks of the known sealing ends and therefore, of having a cable sealing end in which the tight mechanical connection between the box and the insulator is always assured. A further object is to have a tight mechanical connection between the box and the insulator which, besides being of rapid execution, gives the possibility of removing the one from the other and connecting them again in a tight, rapid, simple and reliable manner.

The object of the present invention is a cable sealing end comprising a box having at least a through opening in which a first flange encasing a sealing strip is present in cantilever fashion, at least an insulator having one end which can be inserted into the through opening of the box and which can be connected to this latter within the through opening by means of a screw coupling, said insulator being provided on its own outer surface with a second flange which can be coupled to the outer edge of the box through opening, characterized by the fact of comprising, in correspondence of the facing surfaces of the insulator second flange and of the outer edge of the box through opening, means for mechanically preventing relative rotation between the box and the insulator in the direction opposite to that of their screw coupling rotation. The distance between the part of the mechanical locking means for the second flange, and the insulator end which can be encased in the box through opening is substantially equal to the distance existing between the part of the locking means at the outer edge of the box through opening and the first flange present within this latter.

In particular, the means for mechanically blocking the relative rotation between box and insulator in the direction opposite with respect to that of when the screw coupling operation is carried out has present, in correspondence to the surfaces of the insulator second flange and the outer edge of the box through opening which face each other:

a. a plurality of saw teeth in the face of the second flange turned toward the outer edge of the box through opening; and b. a plurality of saw teeth in the outer edge of the box through opening turned toward the second flange, the saw teeth at the second flange being complementary to, and of a height equal to, the saw teeth at the edge of the box through opening.

In an alternative embodiment, according to the present invention, the means for a mechanical blocking of a sealing end with respect to relative rotation between the box and the insulator, in a direction opposite with respect to the direction of turning during screw coupling operation, has present, in correspondence to the surfaces of the insulator second flange and the outer edge of the box through opening which face each other:

(a) a first ring, provided with means for connecting it to the insulator, arranged on the surface of the second flange facing toward the outer edge of the box through opening, said first ring being provided with a plurality of saw teeth on the surface facing toward the outer edge of the box through opening; and (b) a second ring, of a diameter equal to the diameter of the first ring and provided with means for connecting it to the box, said second ring being arranged on the surface of the outer edge of the box through opening and being provided with a plurality of saw teeth on the surface facing toward the second flange of the insulator and the saw teeth of the first ring being complementary to, and of height equal to, the saw teeth of the second ring.

Other objects and advantages of the present invention will be apparent from the following detailed description of the presently preferred embodiments thereof, which description should be considered in conjunction with the accompanying drawings in which:

FIG. 1 illustrates by way of example a specific form of one embodiment of a cable sealing end according to the present invention.

Figure 1:
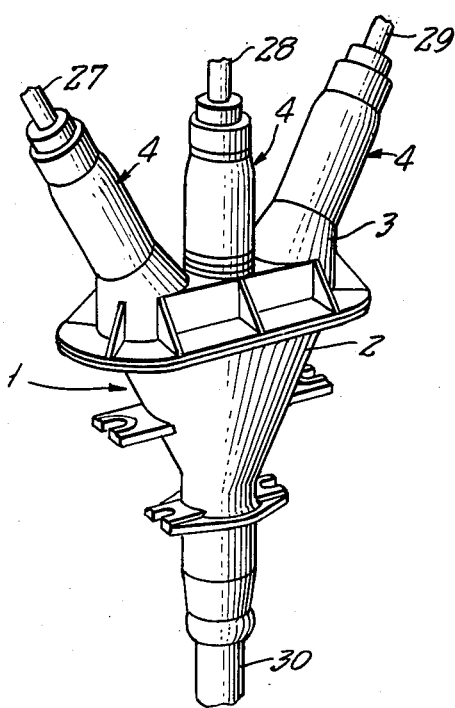
FIG. 1 shows, in perspective view, a cable sealing end according to the present invention.

As shown in FIG. 1, the sealing end 1 has a box formed by two parts 2 and 3 which are connected with each other. Three insulators 4 project from the part 3 of the sealing end box and are connected to this latter.

The connection between the insulators 4 and the sealing end box is obtained through a fluid-tight screw connection between one end of each insulator 4 inserted into a through opening provided in the part 3 of the sealing end box.

Figure 2:
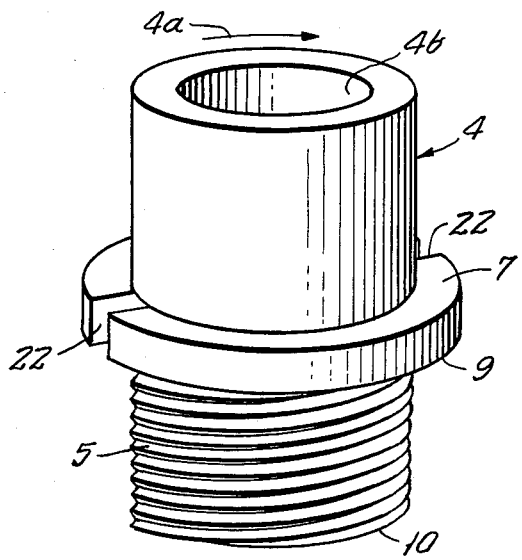
FIG. 2 shows in exploded view, with parts in cross-section, the elements of the preferred embodiment of a sealing end according to the invention.

The connection between each insulator 4 and the part 3 of the sealing end box is, in one embodiment, made through the elements illustrated in FIG. 2, some of which are partially cut away in order to better show its structure. In fact, FIG. 2 illustrates, in exploded view, the portion of connection between an insulator 4 and the box part 3 of a sealing end according to the invention. Each insulator 4 is similarly connected to the part 3. Each insulator 4 has an opening 4b for receiving a conductor 27, 28 and 29 (FIG. 1) of a multi-conductor cable 30.

As shown in FIG. 2, the insulator 4 has one end facing toward the sealing end box part 3. The insulator 4 is provided with a screw thread 5 adapted to engage with a screw thread 6 provided within the through opening of the box part 3. The screw thread 5, at one end of the insulator 4, starts at a flange 7 extending outwardly, in cantilever fashion, from the outer surface of the upper portion of the insulator 4, and ends in proximity to the lower end of such portion and is adapted to be encased within the through opening in the part 3.

Likewise, within the through opening of the part 3 of the box, there is present the screw thread 6 and a flange 8 extending inwardly in cantilever fashion. The screw thread 6 starts at this flange 8 and terminates at the outer end surface 12 of the through opening.

The distance between the surface of the face 9 of the flange 7, which is the face facing toward the through opening of the box, and the end surface 10 of the lower end of the insulator 4 which is inserted into the box through opening is substantially equal to the distance between the face 11 of the flange 8 at the inside of the box through opening and the outer end face 12 of the part 3.

The flange 8, present within the box through opening, has, on its own surface facing toward the upper end of the opening of the through opening, a groove 13 in which a sealing strip 14 of elastomeric material is encased. The sealing strip 14 is an O-ring seal having a rectangular shaped cross-section and has, on its surface facing toward the upper end of the opening in the part 3, a triangular section relief 15.

A pair of rings 16 and 17 of equal diameter are provided in the zone between insulator 4 and box part 3. In particular, the ring 16 can be connected to the insulator 4 at the flange 7, while the ring 17 can be connected to the part 3 at the end surface 12.

The essential characteristic of the two rings 16 and 17 is that of having, on the surfaces facing each other and adapted to come into mutual contact, a plurality of spaced, interengageable projections, such as saw teeth 18 and 19 complementary to each other. Preferably, the teeth 18 are of a height equal to the height of the teeth 19 which are described in detail later on herein.

Moreover, the ring 16 can be connected to the second flange 7 of the insulator 4 in such a way as not to rotate with respect to the insulator 4. To this end the ring 16 is provided on its face 20, which is the face opposite to the one where there the saw teeth 18 are, with a pair of projections 21 in diametrically opposed positions. The projections 21 can be received in grooves 22 in the flange 7 of the insulator 4.

Also, the ring 17 is provided with means to be coupled to the upper end of the through opening of the part 3 of the box so as to prevent rotation thereof with respect to the end face 12 of the through opening itself. To this end, the face 23 of the ring 17, which is the face opposite to the one on which the saw teeth 19 are, is provided with a projecting annular step 24 adapted to be received within the through opening so that the remaining part of the surface 23 of the ring 17 bears against the surface 12 at the upper end of the through opening present in the part 3 of the box. Moreover, the face 23 of the ring 17 is provided with a protuberance 25 adapted to be received with a notch 26 present in the surface 12.

As previously stated, the essential characteristic that the rings 16 and 17 must have is that of having on the surfaces facing each other and adapted to come into mutual contact after the connection between the insulator 4 and the part 3, a plurality of spaced projections, such as the saw teeth 18 and 19 complementary to each other and of substantially equal height.

In particular, each saw tooth 18 and 19 has two faces of which those marked with the reference numerals 18' and 19' have a small inclination with respect to a plane perpendicular to the ring axis of symmetry, while the other faces marked with the reference numerals 18" and 19" are perpendicular to such plane.

The configuration of the saw teeth 18 and 19 of the two rings 16 and 17 is such as to permit a rotation of the insulator 4 within the box through opening in the direction in which the screw thread 5, on the lower portion of the insulator 4, is turned when it engages with the screw thread 6, on the inner surface of the box through opening, when the insulator 4 is being rotated to secure it to the part 3. When the insulator 4 is so turned, the faces 18' and 19' of the saw teeth 18 and 19, which are inclined planes, permit a mutual displacement while a rotation of the insulator 4 in opposite direction is prevented, i.e. a rotation in such a direction as to cause an unscrewing operation between the above mentioned elements is prevented owing to the contact between the faces 18" and 19" of the teeth.

By way of example, in a specific embodiment, the height of the saw teeth 18 and 19 is of about 0.25 mm, while the pitch is of about 2.5 mm.

Figure 4:
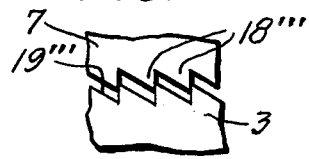
FIG. 4 is a fragmentary, side elevation view of an alternative embodiment of the connection between the box and the insulator with the teeth on the opposed faces of the insulator flange and the box.
Figure 4:
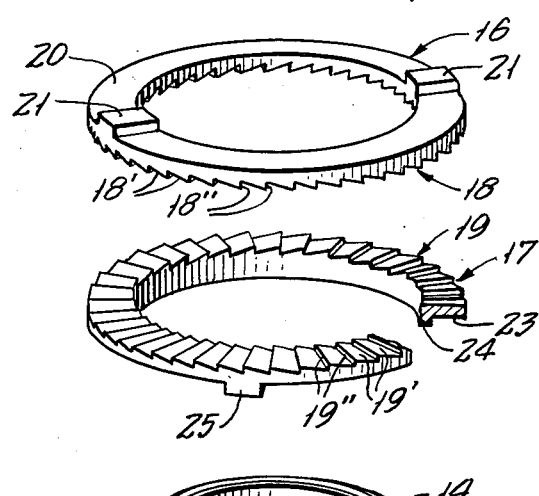
Figure 4:
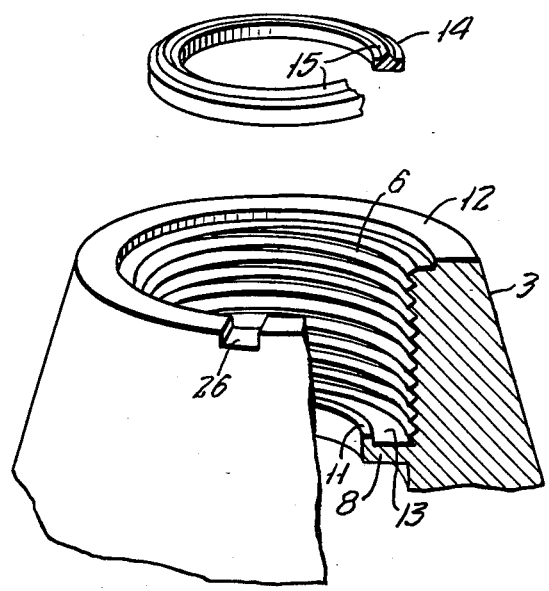

In an alternative embodiment of the present invention, shown in FIG. 4, the rings 16 and 17 which have the saw teeth 18 and 19 are omitted, and in this alternative embodiment, the saw teeth 18''' are on the surface 9 of the flange 7 extending from the insulator 4, while the saw teeth 19''' are on the surface 12 of the box part 3.

The assembling of the sealing end shown in FIG. 1 for tightly connecting the insulators 4 and the part 3 of the box is effected as set forth hereinafter.

When the part 3 of the box is already applied to the cable sealing end and the insulators 4 are not yet connected to the box, the sealing strip 14 is inserted into the groove 13 in the flange 8 present within the box through opening.

At this point the ring 17 is arranged on the part 3 of the box so that the protuberance 25 of the ring 17 is received in the notch 26 in the surface 12 and the annular step or rib 24 is received within the box through opening while the surface 23 of the ring 17 is put into contact with the surface at the upper end of the through opening.

Then, the ring 16 is positioned on the insulator 4, and for this operation, the ring 16 is inserted on the end of the insulator 4, where the screw thread 5 is located, while arranging the protuberances 21 of the ring 16 within the grooves 22 in the flange 7 of the insulator 4.

Now, the end of the insulator 4 provided with the screw thread 5 is inserted into the box through opening thereby engaging the said screw thread 5 with the screw thread 6 present in the said through opening.

By rotating the insulator 4 in the direction of the arrow 4a, the screw thread 5 is screwed into the screw thread 6 and advances the end 10 of the insulator 4 into contact with the portion 15 on the sealing strip 14 and thereafter deforms the sealing strip 14. As the sealing strip 14 is deformed, the teeth 18 and 19 slide on each other, the threads 5 and 6 having a loose enough fit and the teeth 18 and 19 having sufficient resiliency to permit such sliding.

Figure 3:
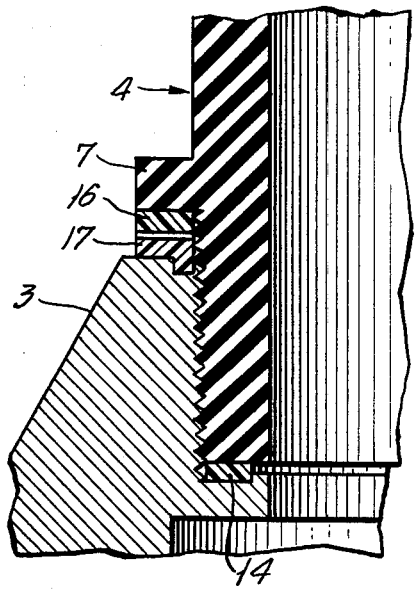
FIG. 3 shows in sectional view the connection made between the box and the insulator in a sealing end according to the embodiment shown in FIG. 2.

The relative positions when the connection between insulation 4 and part 3 of the box is at the end of the assembling operations described above is shown in FIG. 3. As shown in FIG. 3, the insulator 4 has its threaded end inserted and connected in the box part 3 and deforms the sealing strip 14 which assures the tightness of the connection.

Further, the saw teeth 18 and 19 borne by the rings 16 and 17 are engaged with each other, and by means of their engagement, prevent any relative rotation between insulator 4 and box part 3 in direction opposite to the direction of tightening rotation.

From the previous description and from the following considerations, it is understood that by means of the present invention the objectives of the invention are reached.

In fact, the tightness in the connection between box and insulator is optimum, and is maintained, in use, by the deformation of the sealing strip 24 and by the fixed, mechanical connection opposing a separating rotation between the insulator 4 and the box which is provided by the presence of the saw teeth 18 and 19 coupled to each other.

Moreover, the connection between the box 1 and the insulator 4 can be interrupted at any time since it is sufficient to cause the rupture of one of the rings, followed by the removal of the broken ring, to make possible the relative rotation between the insulator 4 and the box part 3 in the direction in which the unscrewing of the screw thread 5 of the insulator 4 with respect to the screw thread 6 in the box part 3 is produced.

When it is desired to effect again the tight connection of the insulator 4 to the box part 3, it is sufficient to replace the broken ring with a new ring and the tight connection between said elements is effected in an easy, rapid and reliable manner.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. In a cable sealing end comprising an insulator with a central bore for the passage of a cable therethrough, a threaded portion around said bore and a first flange extending outwardly of said threaded portion, a box part with a through opening having internal threads which mate with the threaded portion of said insulator and having a second, internal flange around said opening with a resilient sealing member thereon engageable with an end surface of said insulator spaced from said first flange in the direction of said second flange and having an end surface adjacent said first flange when said insulator threaded portion is screwed into said box part through opening, said sealing member being compressed between said end surface of said insulator and said second flange when said insulator threaded portion is screwed into said box part through opening, the improvement comprising said resilient sealing member having an inner dimension at least as large as the dimension of said central bore when such sealing member is compressed between said end surface of said insulator and said second flange, whereby said sealing member does not compress a cable within said central bore when said sealing member is compressed, and mechanical locking means intermediate said first flange and said end surface of said box part for permitting rotation of said insulator in the direction in which it is screwed into said through opening and preventing rotation of said insulator in the opposite direction after said end surface of said insulator engages and compresses said resilient sealing member.

2. A cable sealing end as set forth in claim 1, wherein said locking means comprises a plurality of spaced, first projections on said first flange and a plurality of spaced, second projections on said end surface of said box part engageable with said first projections, said first and second projections being shaped to permit sliding contact therebetween when said insulator is rotated in the direction in which it is screwed into said through opening and to prevent relative movement therebetween, and hence, rotation of said insulator, when said insulator is urged in the opposite direction.

3. A cable sealing end as set forth in claim 2, wherein said first and second projections have the shape of saw teeth.

4. A cable sealing end as set forth in claim 1, wherein said locking means comprises:
- a first ring adjacent said first flange and encircling said threaded portion of said insulator, said first ring being connected to said insulator for rotation therewith and having a plurality of spaced, first projections thereon on the surface thereof facing said end surface of said box part; and
- a second ring intermediate said first ring and said end surface of said box part, said second ring being connected to said box part for preventing rotation thereof with respect to said box part and having a plurality of spaced, second projections engageable with said first projections.

5. A cable sealing end as set forth in claim 4, wherein said first projections are saw teeth and said second projections are saw teeth complementary to the saw teeth of said first projections.

6. A cable sealing end as set forth in claim 4, wherein said first flange has a groove therein and said first ring is connected to said insulator by a projection on said first ring extending into said groove.

7. A cable sealing end as set forth in claim 4, wherein said end surface of said box part has a recess therein and said second ring is connected to said box part by a projection on said second ring extending into said recess.

8. A cable sealing end as set forth in claim 7, wherein said through opening has a sidewall and said second ring has an annular portion extending into said through opening and engaging the sidewall of said through opening.

* * * * *